(No Model.)
J. F. APPLEBY.
WHEEL.
No. 362,142. Patented May 3, 1887.
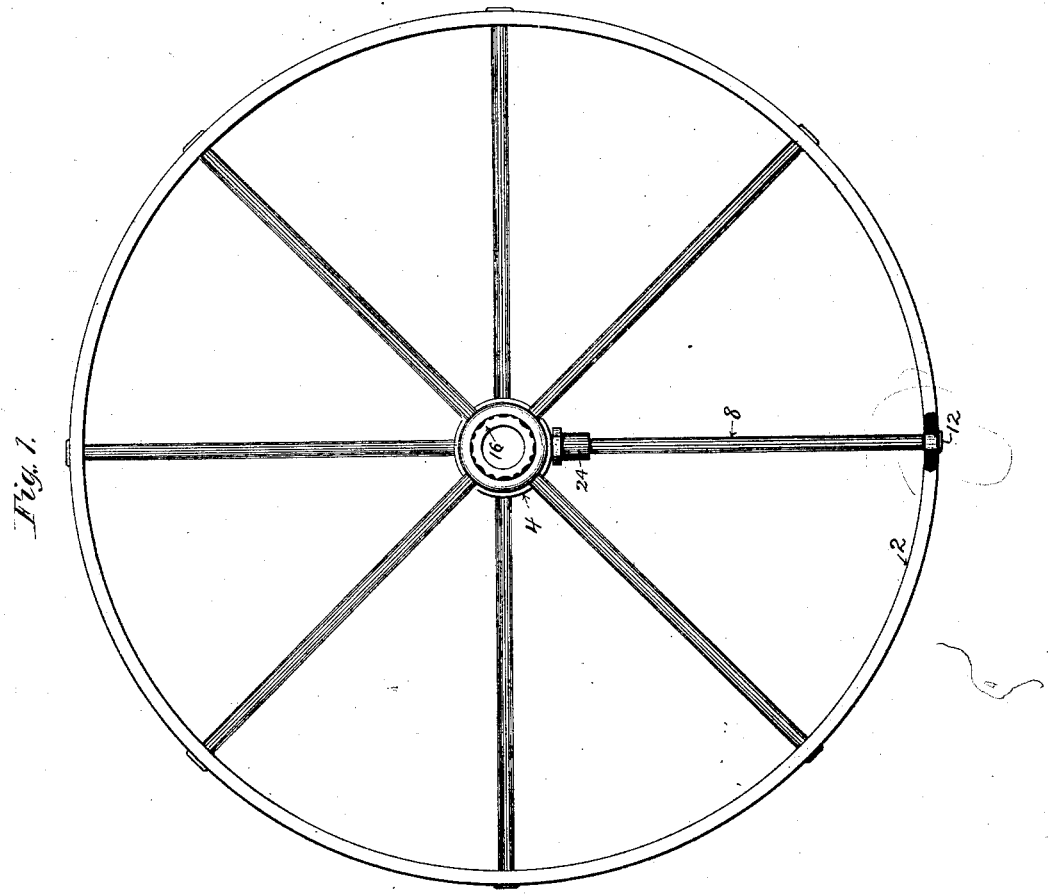
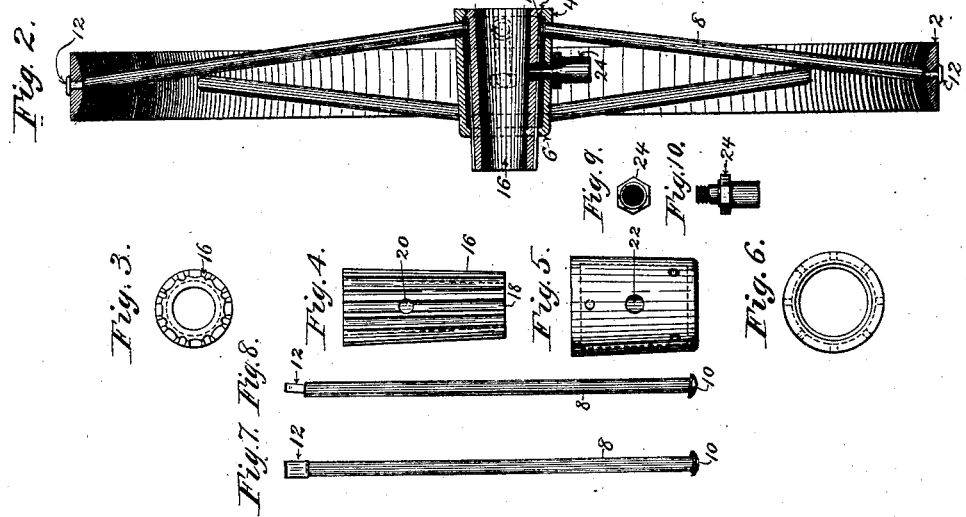
Witnesses
J. Elliott
R. H. Sanford
Inventor
John F. Appleby
By A. C. Paul
att.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

WHEEL.

SPECIFICATION forming part of Letters Patent No. 362,142, dated May 3, 1887.

Application filed March 22, 1886. Serial No. 196,051. (No model.)

*To all whom it may concern:*

Be it known that I, JOHN F. APPLEBY, of Minneapolis, in the county of Hennepin and State of Minnesota, have invented certain Improvements in Wheels, of which the following is a specification.

This invention relates particularly to improvements in the construction of wheels that are designed especially for use upon harvesters, but are applicable generally to agricultural implements, engines, or vehicles.

The object I have in view is to provide a strong durable wheel of simple and inexpensive construction; and the invention consists, generally, in a wheel having within its hub a thimble or box that receives the inward thrust of the spokes.

The invention also consists in the construction hereinafter described, and pointed out in the claims.

The invention further consists in the method herein set forth of forming a wheel.

In the accompanying drawings, forming part of this specification, Figure 1 is a side elevation of a wheel embodying my invention. Fig. 2 is a vertical section of the same. Figs. 3 and 4 are details of the grooved box or sleeve. Figs. 5 and 6 are details of the hub. Figs. 7 and 8 are details of the spokes, and Figs. 9 and 10 are details of the oil-cup.

In the drawings, 2 represents the rim of the wheel, which is preferably composed of metal, and may be of any ordinary form.

4 represents the hub of the wheel, which is preferably formed of malleable metal and preferably slightly tapering in form. The hub is also preferably formed with flanges or bearing-rings 6, located at or near its ends.

The spokes 8 are formed preferably of rods of metal having heads 10 upon their inner ends and shouldered outer ends, 12. These shouldered ends are preferably broad and flat, as shown in Figs. 7 and 8, to form a strong connection with the rim of the wheel.

The hub is formed with a series of inclined holes, 14, located preferably just inside the flanges 6 and alternately at opposite ends of the hub.

The rim of the wheel is formed with a series of slots that receive the shouldered ends of the spokes. The spokes are inserted into the open end of the hub and passed out through the holes 14, the heads 10 are brought against the inner surface of the hub, and the shouldered ends are inserted into the slots in the rim of the wheel and are riveted over against its outer surface.

16 represents a tapering cast-metal box or thimble having, preferably, a series of longitudinal grooves, 18, in its outer surface. These grooves are of sufficient depth to receive the rounded portions of the heads of the spokes that project into the hub beyond the surface of the flanges 6. The smaller end of the box is inserted into the larger end of the hub, with the heads of the spokes in its grooves, and it is driven into position, as shown in Fig. 2, thereby securely and firmly holding the spokes and making it impossible for them to be forced inward.

The hub is preferably formed of malleable metal, and is quite thin, while the thimble is formed of hard cast metal. When the thimble is inserted, the hub yields slightly and a very close fit between the box and hub is made.

The box is preferably formed with a threaded hole, 20, and the hub with a smooth hole, 22. These holes are arranged to register with each other when the box is in place. An oil-cup, 24, having a threaded end, is inserted through the hole 22, and is screwed into the hole 20, thereby preventing any movement of the box. A bolt may be used, in place of the oil-cup, to hold the thimble in place. The flanges 6 are the only parts of the hub that bear upon the box, so that the box is easily inserted into the hub.

The taper of the hub causes the wheel to be slightly dished.

It will be seen that while the wheel is very simple and inexpensive it is very strong and durable, and that if any part becomes worn or broken it may be replaced at small expense. The wheel is therefore especially adapted for harvesters and mowing-machines, but may also be used with advantage on other implements or vehicles.

The inner ends of the spokes may be threaded with nuts, which prevent their moving outward, while the sleeve receives the inward thrust, as before. In this instance the nuts may be first applied to the bolts, and they may then be inserted, as described, or the ends of the spokes may be inserted from the outside, and the nuts may then be screwed on; or the inner ends of the spokes may be made plain. The thimble may be made without the grooves on its outer surface, in which case, when the spokes with heads are used, the heads of the spokes will be wholly within the space inclosed by the flanges 6.

The details of construction may be varied without departing from my invention, as I believe myself the first to provide a wheel with a thimble within its hub which receives the inward thrust of the spokes.

I claim as my invention—

1. The combination, in a wheel, of a suitable hub, a series of spokes having heads inside the hub, and a thimble inserted in the hub and having grooves that receive the heads of the spokes, substantially as described.

2. The combination, in a wheel, of the hub having the flanges 6, the spokes having heads upon the inside of said hub, and the box inserted in said hub and having grooves that receive the heads of the spokes.

3. The combination, with the hub having the hole 20 and the spokes having heads inside the hub, of the box having grooves that receive the heads of the spokes, and the oil-cup passing through the hole in the hub and screwed into the box, substantially as described.

In testimony whereof I have hereunto set my hand this 15th day of March, 1886.

JOHN F. APPLEBY.

In presence of—
R. H. SANFORD,
A. C. PAUL.